US009855547B2

United States Patent
Qi et al.

(10) Patent No.: US 9,855,547 B2
(45) Date of Patent: Jan. 2, 2018

(54) LOW-TEMPERATURE OXIDATION CATALYSTS

(71) Applicant: GM GLOBAL TECHNOLOGY OPERATIONS LLC, Detroit, MI (US)

(72) Inventors: Gongshin Qi, Troy, MI (US); Se H. Oh, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/247,230

(22) Filed: Aug. 25, 2016

(65) Prior Publication Data

US 2017/0095796 A1 Apr. 6, 2017

Related U.S. Application Data

(60) Provisional application No. 62/237,379, filed on Oct. 5, 2015.

(51) Int. Cl.
*B01J 21/04* (2006.01)
*B01J 21/06* (2006.01)
(Continued)

(52) U.S. Cl.
CPC ............ *B01J 23/44* (2013.01); *B01D 53/944* (2013.01); *B01J 21/04* (2013.01); *B01J 23/10* (2013.01);
(Continued)

(58) Field of Classification Search
CPC . B01J 21/04; B01J 21/066; B01J 23/10; B01J 23/40; B01J 23/42; B01J 23/44;
(Continued)

(56) References Cited

U.S. PATENT DOCUMENTS 4,931,419 A * 6/1990 Blanchard ............ B01D 53/945
423/213.5
4,985,387 A * 1/1991 Prigent ................ B01D 53/945
423/213.5
(Continued)

FOREIGN PATENT DOCUMENTS

CN 103974759 8/2014
EP 0695580 3/2003
(Continued)

OTHER PUBLICATIONS

Chen, et al; "Development of low temperature three-way catalysts for future fuel effecient vehicles"; Johnson Matthey Technol. Rev.; 2015; vol. 59; (1); pp. 64-67.
(Continued)

*Primary Examiner* — Cam N. Nguyen
(74) *Attorney, Agent, or Firm* — Harness, Dickey & Pierce, P.L.C.

(57) ABSTRACT

An example of a catalytic converter includes a catalyst to improve low temperature oxidation of carbon monoxide (CO) and hydrocarbons. The catalyst includes a support, which includes a porous alumina structure and a rare earth metal oxide promoter impregnated into pores of the porous alumina structure. The rare earth metal oxide promoter is selected from the group consisting of $CeO_2$ and $CeO_2$—$ZrO_2$. A platinum group metal (PGM) is bonded to the support.

15 Claims, 3 Drawing Sheets

(51) Int. Cl.

| | |
|---|---|
| *B01J 23/10* | (2006.01) |
| *B01J 23/40* | (2006.01) |
| *B01J 23/42* | (2006.01) |
| *B01J 23/44* | (2006.01) |
| *B01J 23/46* | (2006.01) |
| *B01J 23/63* | (2006.01) |
| *B01J 37/02* | (2006.01) |
| *B01J 37/08* | (2006.01) |
| *B01J 37/12* | (2006.01) |
| *B01J 35/04* | (2006.01) |
| *B01D 53/94* | (2006.01) |
| *B01J 35/00* | (2006.01) |
| *F01N 3/28* | (2006.01) |
| *F01N 3/10* | (2006.01) |

(52) U.S. Cl.
CPC ............ *B01J 35/0006* (2013.01); *B01J 35/04* (2013.01); *F01N 3/2828* (2013.01); *B01D 53/945* (2013.01); *B01D 2255/1021* (2013.01); *B01D 2255/1023* (2013.01); *B01D 2255/2065* (2013.01); *B01D 2255/2092* (2013.01); *B01D 2255/9022* (2013.01); *F01N 3/101* (2013.01); *F01N 3/103* (2013.01); *F01N 2330/06* (2013.01); *F01N 2370/00* (2013.01); *Y02T 10/22* (2013.01)

(58) Field of Classification Search
CPC ... B01J 23/46; B01J 23/63; B01J 37/02; B01J 37/0236; B01J 37/08; B01J 37/12; B01J 35/04
See application file for complete search history.

(56) References Cited

U.S. PATENT DOCUMENTS

| | | | | |
|---|---|---|---|---|
| 5,128,306 | A * | 7/1992 | Dettling | B01D 53/945 423/213.5 |
| 5,139,992 | A * | 8/1992 | Tauster | B01D 53/945 423/213.5 |
| 5,334,570 | A * | 8/1994 | Beauseigneur | B01J 23/40 502/240 |
| 5,856,263 | A * | 1/1999 | Bhasin | B01D 53/945 423/213.5 |
| 6,022,825 | A | 2/2000 | Anderson et al. | |
| 6,335,305 | B1 * | 1/2002 | Suzuki | B01D 53/945 502/325 |
| 6,395,675 | B1 * | 5/2002 | Suga | B01D 53/945 502/302 |
| 6,413,483 | B1 * | 7/2002 | Brisley | B01D 53/9422 423/213.2 |
| 6,531,425 | B2 * | 3/2003 | Golden | B01D 53/945 502/302 |
| 7,323,432 | B2 | 1/2008 | Niihara et al. | |
| 7,871,452 | B2 * | 1/2011 | Yamada | B01D 53/945 422/177 |
| 8,052,936 | B2 * | 11/2011 | Harada | B01D 53/944 422/177 |
| 8,187,548 | B2 * | 5/2012 | Yamada | B01D 53/944 422/177 |
| 8,211,392 | B2 | 7/2012 | Grubert et al. | |
| 8,349,761 | B2 | 1/2013 | Xia et al. | |
| 8,545,780 | B1 * | 10/2013 | Chen | B01D 53/945 423/213.2 |
| 8,551,908 | B2 * | 10/2013 | Satou | B01D 53/945 502/262 |
| 8,835,346 | B2 * | 9/2014 | Gramiccioni | B01J 37/0242 423/213.2 |
| 8,992,869 | B2 | 3/2015 | Ratts et al. | |
| 9,029,288 | B2 * | 5/2015 | Suzuki | B01J 21/066 502/333 |
| 9,550,169 | B2 * | 1/2017 | Kadota | C04B 38/0006 |
| 2002/0082163 | A1 | 6/2002 | Yan et al. | |
| 2007/0099298 | A1 * | 5/2007 | Suzuki | B01D 53/945 436/37 |
| 2007/0196245 | A1 * | 8/2007 | Fujita | B01D 53/944 422/177 |
| 2008/0081761 | A1 * | 4/2008 | Suzuki | B01D 53/945 502/304 |
| 2008/0214390 | A1 * | 9/2008 | Suzuki | B01D 53/8609 502/339 |
| 2008/0254973 | A1 * | 10/2008 | Okamoto | B01D 53/944 502/185 |
| 2009/0041645 | A1 | 2/2009 | Wassermann et al. | |
| 2009/0099012 | A1 * | 4/2009 | Suzuki | B01D 53/944 502/303 |
| 2009/0124494 | A1 * | 5/2009 | Suzuki | B01D 53/945 502/325 |
| 2010/0086832 | A1 | 4/2010 | Lopez et al. | |
| 2010/0204518 | A1 | 8/2010 | Wolf et al. | |
| 2011/0223096 | A1 | 9/2011 | Wolf et al. | |
| 2012/0129690 | A1 * | 5/2012 | Larcher | B01J 21/12 502/304 |
| 2013/0034472 | A1 | 2/2013 | Cantrell et al. | |
| 2014/0057781 | A1 | 2/2014 | Stamm Masias et al. | |
| 2014/0369912 | A1 * | 12/2014 | Zheng | B01J 23/63 423/213.5 |
| 2015/0140317 | A1 * | 5/2015 | Biberger | B01J 21/04 428/317.9 |
| 2015/0231566 | A1 | 8/2015 | Xu et al. | |
| 2015/0266004 | A1 * | 9/2015 | Kumatani | B01J 21/066 502/304 |
| 2015/0266014 | A1 | 9/2015 | Xue et al. | |

FOREIGN PATENT DOCUMENTS

| | | |
|---|---|---|
| GB | 2522978 | 8/2015 |
| JP | 2006192357 | 7/2006 |
| JP | 2009247968 | 10/2009 |
| JP | 2011230104 | 11/2011 |
| JP | 05747952 | 7/2015 |
| JP | 05806536 | 11/2015 |
| KR | 2011001004 | 1/2011 |
| KR | 1092606 | 12/2011 |
| WO | WO2007063615 | 6/2007 |
| WO | WO2013182302 | 12/2013 |

OTHER PUBLICATIONS

Chang, et al.; "Gasoline cold start concept (gCSC) technology for low temperature emission control"; SAE Int. J. Fuels Labr. 7(2); 2014 pp. 480-488.

Dai, et al.; "A sinter-resistant Catalytic system based on platinum nanoparticles supported on TiO2 nanofibers and covered by porous silica"; Angew. Chem.Int. Ed.; 2010; vol. 49 pp. 8165-8168.

Lu, et al.; "Cooking- and sintering-resistant palladium catalysts achieved through atomic layer deposition" Science; 2012; vol. 335; No. 6073; pp. 1205-1208 Abstract Only.

Pan, et al. "Effect of alumina on structure and acidity of solid acid catalyst Pt—SO_4~(2-)/ZrO_2-Al_20_3"; Chinese Journal of Catalysis; 2005; Abstract Only.

Wang; "Fabrication and testing of low-temperature catalytically active washcoat materials for next-generation vehicle catalytic converters"; YSU-CTME; 2013; pp. 1-9.

Li, et al.; "A sintering-resistant Pd/Si02 catalyst by reverse-loading nano iron oxide for aerobic oxidation of benzyl alcohol"; RSC Advances; 2015; vol. 5; pp. 4766-4769; Abstract Only.

Lu, et al.; "A sinter-resistant catalytic system fabricated by maneuvering the selectivity of Si02 deposition onto the Tio2 surface versus the pt nanoparticle surface"; Nano Lett.; 2013; vol. 13 (10); pp. 4957-4962; Abstract Only.

\* cited by examiner

LOW-TEMPERATURE OXIDATION CATALYSTS

CROSS-REFERENCE TO RELATED APPLICATIONS

This application claims the benefit of U.S. Provisional Application Ser. No. 62/237,379, filed Oct. 5, 2015, which is incorporated by reference herein in its entirety.

TECHNICAL FIELD

The present disclosure relates generally to oxidation catalysts and, more specifically, to improving catalytic activity at low temperatures, such as during an initial cold-start.

BACKGROUND

Vehicles with an Internal Combustion Engine (ICE) include an exhaust gas treatment system for treating the exhaust gas from the engine. The configuration of the treatment system depends, in part, upon whether the engine is a diesel engine (which typically operates with lean burn combustion and contains high concentrations of oxygen in the exhaust gases at all operating conditions) or a stoichiometric spark-ignited engine (which operates at a nearly stoichiometric air-to-fuel (A/F) ratio). The treatment system for the diesel engine includes a diesel oxidation catalyst (DOC), which is capable of oxidizing carbon monoxide (CO) and hydrocarbons (HC). The treatment system for the stoichiometric spark-ignited engine includes a three-way catalyst (TWC), which operates on the principle of non-selective catalytic reduction of $NO_x$ by CO and HC.

SUMMARY

An example of a catalytic converter includes a catalyst to improve low temperature oxidation of carbon monoxide (CO) and hydrocarbons. The catalyst includes a support, which includes a porous alumina structure and a rare earth metal oxide promoter impregnated into pores of the porous alumina structure. The rare earth metal oxide promoter is selected from the group consisting of $CeO_2$ and $CeO_2$—$ZrO_2$. A platinum group metal (PGM) is bonded to the support.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

DOCs and TWCs often include Platinum Group Metals (PGM) as the active catalytic/catalyst material. In either the DOC or the TWC, the catalyst material is not operational until it is heated to a certain temperature, often referred to as the "light-off" temperature. The exhaust gas may be used to heat the catalyst material to the light-off temperature for treatment of the exhaust gas.

Some fuel-saving technologies (including lean burn, turbocharging, and advanced combustion) lower exhaust temperatures. Lowering exhaust temperatures can make emission control challenging because the active catalyst material may not reach its operational temperature in a desirable time frame.

Various efforts have been made to improve upon the treatment of the exhaust gas. In one approach, exhaust gas heaters (e.g., electric heating modules) have been incorporated into the exhaust gas treatment system between the engine and the DOC or TWC. The exhaust gas heater increases the temperature of the exhaust gas, which can reduce the time it takes to heat the catalyst to the light-off temperature. While effective to speed up exhaust gas treatment, the inclusion of such a device may significantly add to the complexity and cost of the exhaust gas treatment system.

In another approach, fuel energy has been used to raise the exhaust gas temperature. For example, gasoline or diesel fuel may be injected into the engine near the end of the combustion cycle or into the exhaust gas stream upstream of the catalytic converter. The hydrocarbons from the injected fuel combust to add additional heat to the flow of exhaust gas, which can decrease the time it takes to bring the catalyst up to the light-off temperature. While effective to speed up exhaust gas treatment, this approach is estimated to increase fuel consumption by about 3% for every 50° C. increase in exhaust temperature. Increasing fuel consumption to raise the catalyst temperature quickly may not be desirable in view of stringent fuel economy objectives expected in the future.

Rather than increasing the temperature of the exhaust gas, the examples disclosed herein include catalysts with improved activity. These catalysts may be considered fast light-off catalysts, which allow the catalytic converter to work sooner by decreasing the exhaust temperature required for operation (i.e., by decreasing the light-off temperature). As such, the examples disclosed herein may be used for low-temperature CO/HC emission control, e.g., during a cold-start period (i.e., an attempt to start a vehicle's engine when it is cold, relative to its normal operating temperature).

Figure 1:
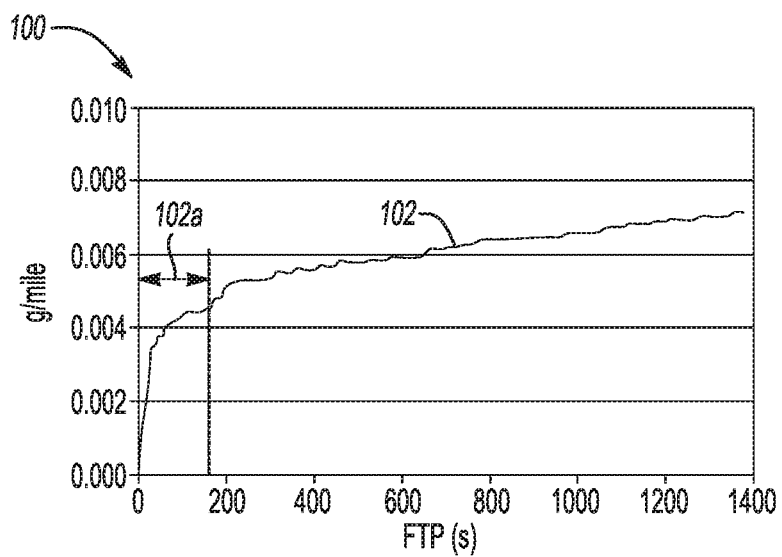
FIG. 1 on coordinates of cumulative tailpipe emissions (in g/mile) and time (in seconds), is a plot of hydrocarbon cumulative tailpipe emissions as a function of FTP time, where FTP refers to the FTP-75 Federal Test Procedure.

Effective control of hydrocarbon emissions during cold-start periods, e.g., at low temperatures, is important for emission compliance. An example of a cold-start period is shown in FIG. 1, which is a plot 100 of hydrocarbon cumulative tailpipe emissions (in g/mile) as a function of FTP time (in seconds), where FTP refers to the FTP-75 test (Federal Test Procedure 75 established by the US EPA). In FIG. 1, curve 102 is a measure of the cumulative tailpipe emissions over time. Portion 102a is the time it takes to get from an initial start to a relatively steady state. From this plot 100, it is seen that it takes about 200 seconds, or about 3 minutes, to get to a relatively steady state, and that the majority of HC tailpipe emission occurs during the first few minutes after engine cold-start, when the exhaust temperature is low.

Figure 2:
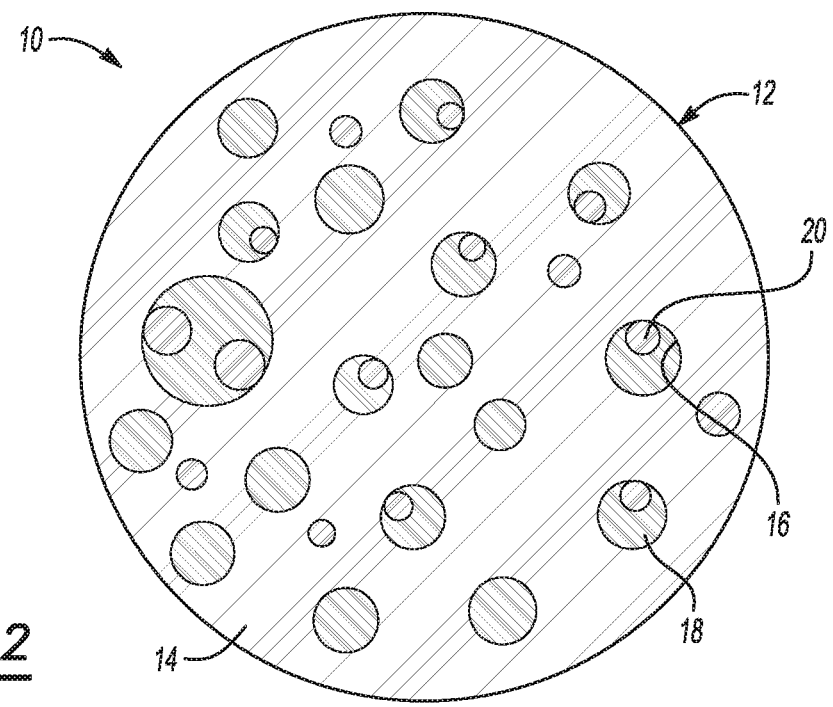
FIG. 2 is a schematic cross-sectional view of an example of the catalyst disclosed herein.

The catalyst disclosed herein improves low temperature oxidation of CO and HC (and thus improves emission control during cold-start periods) by decreasing the light-off temperature. An example of the catalyst 10 is shown in FIG. 2.

The catalyst 10 includes the support 12. The support 12 includes a porous alumina ($Al_2O_3$) structure 14 and a rare earth metal oxide promoter 18 impregnated into at least some of the pores 16 of the porous alumina structure 14.

The porous alumina structure 14 may be powder, spheres, or any other suitable configuration. The pore volume of the porous alumina structure 14 ranges from about 0.5 ml/g to about 2 ml/g.

The rare earth metal oxide promoter 18 may be $CeO_2$ (ceria) or $CeO_2$—$ZrO_2$ (ceria-zirconia). When the rare earth metal oxide promoter 18 is $CeO_2$—$ZrO_2$, it may have a weight ratio of $CeO_2$:$ZrO_2$ ranging from 90:10 to 10:90. The rare earth metal oxide promoter 18 makes up to about 30 weight percent (wt %) of the catalyst 10. Incorporating the rare earth metal oxide as a promoter 18 in the support 12 of the catalyst 10 reduces the light-off temperature of the catalyst 10. As such, the addition of these rare earth metal oxide promoters 18 enables higher CO/HC oxidation efficiency at lower temperatures.

The catalyst 10 also includes a PGM 20 bonded to the support 12. The PGM 20 may be bonded to the surface of the porous alumina structure 14, within the pores 16 of the porous alumina structure 14, and/or to the surface of the rare earth metal oxide promoter 18 that is present within the pores 16 of the porous alumina structure 14. The PGM 20 is the active catalytic material, and may be palladium (Pd), platinum (Pt), rhodium (Rh), ruthenium (Ru), osmium (Os), iridium (Ir), or various combinations thereof (e.g., Pd and Pt, Pt and Rh, Pd and Rh, Pd, Pt and Rh, Pt and Ir, Pd and Os, or any other combination). The PGM 20 is present in the catalyst 10 in an amount ranging from about 0.1 wt % to about 10 wt % of the catalyst 10.

The catalyst 10 may be formed by impregnating the rare earth metal oxide promoter 18 into at least some of the pores 16 of the porous alumina structure 14 to form the support 12, and then depositing the PGM 20 on the support 12. This method reduces the CO and HC light-off temperatures of the catalyst 10, and of a catalytic converter in which the catalyst 10 is used.

Impregnating the rare earth metal oxide promoter 18 into at least some of the pores 16 of the porous alumina structure 14 utilizes a rare earth metal oxide precursor solution. The rare earth metal oxide precursor solution may be an aqueous solution containing water and a rare earth metal oxide precursor (e.g., cerium and/or zirconium nitrate, cerium and/or zirconium acetate, etc.). Examples of the rare earth metal oxide precursor solution include a cerium nitrate solution, a cerium acetate solution, a cerium nitrate and zirconium nitrate solution, a cerium acetate and zirconium acetate solution, or combinations thereof. The cerium nitrate and/or cerium acetate solutions may be utilized to form the $CeO_2$ precursor 18. The cerium nitrate and zirconium nitrate solution and/or the cerium acetate and zirconium acetate solution may be utilized to form the $CeO_2$—$ZrO_2$ precursor 18.

The concentration of the precursor solution depends upon the desired loading of the rare earth metal oxide precursor 18 in the catalyst 10. For example, 60 g total of a support 12 with 17% ceria equates to 10.2 g ceria (i.e., 17% of 60 g).

The mass ratio of ceria to ceria precursor may be used to determine how much of the ceria precursor should be used to achieve the desired mass of ceria for the catalyst 10. In other words, the desired mass of ceria for the support 12 may be converted to the mass of the precursor (e.g., cerium nitrate hexahydrate) for the precursor solution. An aqueous solution may be prepared with the mass of the precursor and a volume of water that will achieve incipient wetness. This solution may be added to 48.8 g of dried alumina (i.e., 60 g total–10.2 g ceria=g alumina).

The porous alumina structure 14 (e.g., alumina powder, alumina spheres, etc.) is added into the rare earth metal oxide precursor solution. The porous alumina structure 14 is allowed to absorb the rare earth metal oxide precursor solution. Absorption may occur for about 1 hour to about 2 hours. The absorption of the precursor solution into the pores 16 of the porous alumina structure 14 forms a support precursor. The pH of the precursor solution is maintained throughout impregnation. The pH ranges from about 0.5 to about 3. The maintenance of the pH within this range prevents the rare earth metal oxide from prematurely precipitating out of the solution and depositing on the surface of the porous alumina structure 14. In some instances, enough of the rare earth metal oxide precursor solution to fill the pores 16 is utilized, without the addition of excess solution.

The support precursor is then exposed to drying and calcining to convert the rare earth metal oxide precursor to the rare earth metal oxide promoter 18. This conversion takes place within the pores 16 of the porous alumina structure 14. During drying and calcining, the formed rare earth metal oxide promoter 18 binds to the pore surfaces of the porous alumina structure 14. This process forms the support 12. Drying may be performed at a temperature ranging from about 90° C. to about 120° C. and calcining may be performed at a temperature ranging from about 350° C. to about 650° C. In an example, drying is performed at a temperature of about 120° C. and calcining is performed at a temperature of about 550° C.

After the support 12 is formed, the PGM 20 is then deposited on the support 12. The PGM may be deposited using a pore filling method, which is similar to the previously described impregnation method. Impregnating the PGM 20 onto the support 12 utilizes a PGM precursor solution. The PGM precursor solution may be an aqueous solution containing water and a PGM precursor (e.g., platinum, palladium, and/or rhodium nitrate, platinum, palladium, and/or rhodium acetate, platinum(II) chloride, chloroplatinic acid, etc.). PGM precursors of ruthenium, osmium, and/or iridium may also be used. Examples of the PGM precursor solution include a platinum nitrate solution, a platinum acetate solution, a palladium nitrate solution, a palladium acetate solution, a rhodium nitrate solution, a rhodium acetate solution, a platinum(II) chloride solution, or combinations thereof. The combinations may be used to form mixtures of different types of PGM 20 (e.g., a mixture of platinum and palladium particles). The concentration of the precursor solution depends upon the desired loading of the PGM 20 on the support 12 and in the catalyst 10.

The PGM precursor solution is added to the support 12, and is allowed to absorb into any remaining free space within the pores 16. The support 12 is then is then exposed to drying and calcining to convert the PGM precursor to the PGM 20. In an example, drying is performed in air for a time period ranging from about 12 hours to about 24 hours, and calcining is performed at a temperature of about 550° C. for a time period of about 2 hours. This process decomposes the PGM precursor and forms the PGM 20.

As a result of this process, and since the pores 16 of the porous alumina structure 14 have been at least partially filled with the rare earth metal oxide promoter 18, the PGM 20 may bond to exterior surfaces of the porous alumina structure 14, any interior surfaces of the pores 16 of the porous alumina structure 14 that are not already occupied by the rare earth metal oxide promoter 18, and/or to the surface of the rare earth metal oxide promoter 18 present within the pores 16 of the porous alumina structure 14.

Figure 3A:
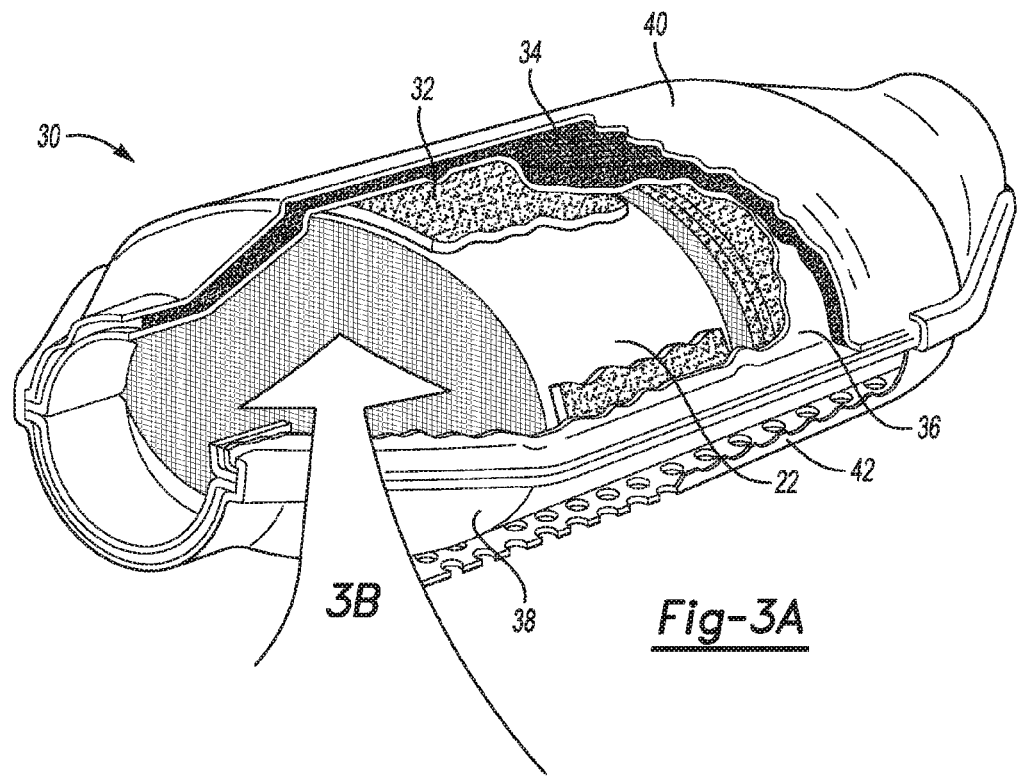
FIG. 3A is a perspective, partially cut-away view of an example of a catalytic converter.

The catalyst 10 may be applied to a monolith substrate and utilized in a catalytic converter. An example of the catalytic converter is shown in FIG. 3A and an example of the monolith substrate is shown in both FIGS. 3A and 3B.

The catalytic converter 30 includes the monolith substrate 22. The monolith substrate 22 may be formed of a ceramic or a metal alloy that is capable of withstanding high temperatures (e.g., 100° C. or higher). Synthetic cordierite is a magnesium-alumino-silicate ceramic material that is suitable for use as the monolith substrate 22. A ferritic iron-chromium-aluminum alloy is an example of a metal alloy that is suitable for use as the monolith substrate 22. The monolith substrate 22 has a honeycomb or other three-dimensional structure.

Figure 3B:
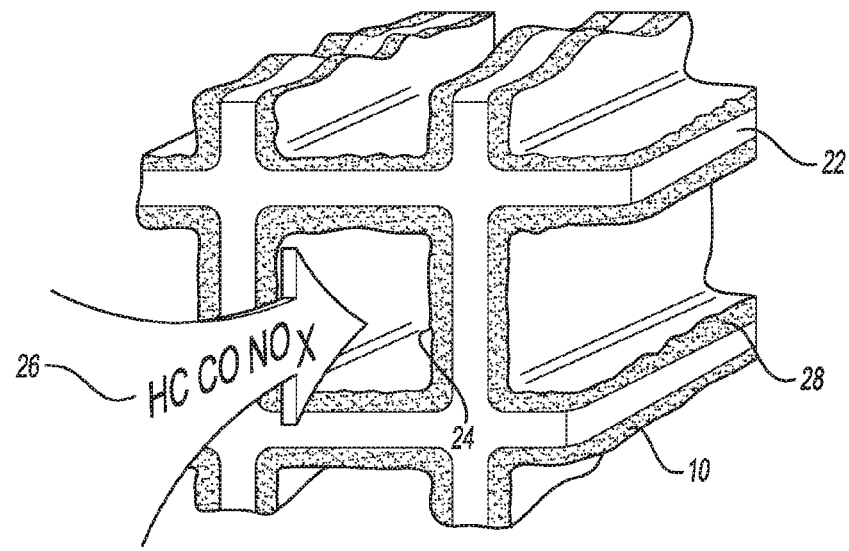
FIG. 3B is an enlargement of a portion of FIG. 3A.

An enlarged view of a portion of the monolith substrate 22 is depicted in FIG. 3B. The monolith substrate 22 includes a large number of parallel flow channels 24 to allow for sufficient contact area between the exhaust gas 26 and the catalyst 10 (contained in coating 28) without creating excess pressure losses.

The coating 28 includes the catalyst 10 disclosed herein. In some instances, the coating 28 may also include a binder material (e.g., sol binders or the like). The coating 28 may be applied to the monolith substrate 22 by washcoating or some other similar process.

Referring back to FIG. 3A, in the catalytic converter 30, the monolith substrate 22 is surrounded by a mat 32, which in turn is surrounded by insulation 34. Upper and lower shells 36, 38 (formed of metal) may be positioned between the mat 32 and the insulation 34. An insulation cover 40 may be positioned over the upper shell 36 and the insulation 34 thereon, and a shield 42 may be positioned adjacent to the lower shell 38 and the insulation 34.

The catalytic converter 30 may be a DOC, which is used in a diesel engine. The DOC is a two way catalytic converter, which eliminates hydrocarbons and CO by oxidizing them, respectively, to water and $CO_2$. The DOC may also exhibit $NO_x$ storage capability during the vehicle cold-start period. In such diesel engines, the reduction of $NO_x$ to water and $N_2$ may take place in a separate unit, and may involve the injection of urea into the exhaust. In an example, the carbon monoxide (CO) light-off temperature of the DOC is 184° C. or less and the hydrocarbon light-off temperature of the DOC is 197° C. or less.

The catalytic converter 30 may also be a TWC, which is used in a stoichiometric spark-ignited engine. The TWC is a three way catalytic converter, which reduces NOx to $N_2$, and oxidizes HC and CO, respectively, to water and $CO_2$. It is believed that the catalyst 10 disclosed herein can also reduce the light-off temperature of the TWC.

To further illustrate the present disclosure, examples are given herein. It is to be understood that these examples are provided for illustrative purposes and are not to be construed as limiting the scope of the present disclosure.

EXAMPLE 1

DOC catalyst powders were prepared. A comparative DOC powder included a platinum/palladium mixture supported on a porous alumina structure. This comparative DOC powder was prepared by loading 1 wt % Pt and 0.5 wt % Pd onto the porous alumina structure using an impregnation method. The solutions used in the impregnation method were a chloroplatinic acid solution and a palladium nitrate solution.

An example DOC powder included a platinum/palladium mixture supported on a porous alumina structure, which had ceria impregnated into its pores. 60 g total of support with 17% ceria was prepared. An aqueous solution of cerium nitrate hexahydrate (enough to form 10.2 g ceria (17% of 60) in the support) in water (enough volume for incipient wetness) was prepared. This solution was mixed with 48.8 g of dried alumina, and the solution absorbed the pores of the alumina. The support was dried and calcined. 1 wt % Pt and 0.5 wt % Pd were loaded onto the ceria impregnated alumina support using an impregnation method (using a chloroplatinic acid solution and a palladium nitrate solution), drying in air overnight, and calcining at 550° C. for 2 hours.

The comparative and example powder catalysts were exposed to hydrothermal aging in an oven at 750° C. for 48 hours in air with 10% water vapor. Prior to evaluation, the aged comparative and example powder catalysts were pre-treated at 500° C. for 30 minutes under 10% oxygen gas ($O_2$).

The catalysts were then exposed to exhaust gas (containing 500 ppm CO, 240 ppm $C_3H_6$, 120 ppm $C_3H_8$, 5% $O_2$, and 5% $H_2O$) at an inlet temperature that was ramped up at a rate of 10° C. per minute. The space velocity (SV) was 960,000 $cm^3$ $g_{catalyst}^{-1}$ $h^{-1}$, where space velocity refers to the quotient of the entering volumetric flow rate of the reactants divided by the reactor volume (or the catalyst bed volume) in a unit time. The conversion of CO and $C_3H_6$ was determined.

Figure 4:
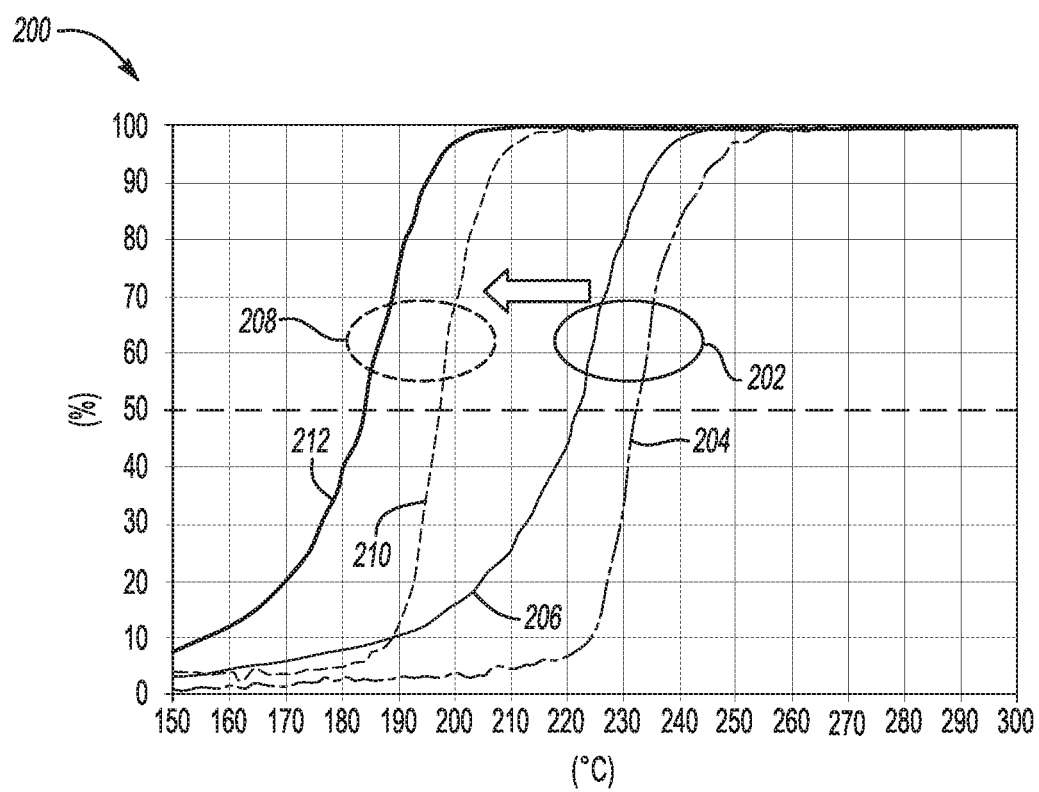
FIG. 4, on coordinates of conversion (in percent) and temperature (in ° C.) is a plot of the conversion of CO and $C_3H_6$ as a function of inlet temperature for example and comparative DOCs.

FIG. 4 is a plot 200 of percent conversion of CO and $C_3H_6$ as a function of inlet temperature in ° C. Two sets of curves are shown in FIG. 4. One set, denoted 202, includes curves 204 and 206, respectively, for $C_3H_6$ and CO oxidation by the comparative powder catalyst. A second set, denoted 208, includes curves 210 and 212, respectively, for $C_3H_6$ and CO oxidation by the example powder catalyst. That is, curve 206 shows the CO conversion for the comparative $PtPd/Al_2O_3$ catalyst, and curve 212 shows the CO conversion for the example $PtPd/CeO_2$ impregnated-$Al_2O_3$ catalyst; while curve 204 shows the $C_3H_6$ conversion for the comparative $PtPd/Al_2O_3$ catalyst, and curve 210 shows the $C_3H_6$ conversion for the example $PtPd/CeO_2$ impregnated-$Al_2O_3$ catalyst. There is a considerable decrease in the light-off temperature when the PGMs are supported on $Al_2O_3$ containing impregnated ceria. Table I shows the light-off temperatures, as measured at $T_{50}$, which is the temperature at which 50% conversion is achieved. The lower $T_{50}$, the better. As illustrated, the catalyst disclosed herein (including the rare earth metal oxide promoter impregnated into the porous alumina structure) exhibits lower CO/HC light-off temperatures than the comparative catalyst including the porous alumina structure.

TABLE I

| | CO/$C_3H_6$ Light-Off Temperature ($T_{50}$). | | |
|---|---|---|---|
| | Comparative PtPd/$Al_2O_3$ | PtPd/$CeO_2$ impregnated-$Al_2O_3$ | ΔT |
| CO | 223° C. | 184° C. | 39° C. |
| $C_3H_6$ | 233° C. | 197° C. | 36° C. |

The drop in the light-off temperatures (ΔT ranging from about 30° C. to about 40° C.) of the PtPd/$CeO_2$ impregnated-$Al_2O_3$ catalyst (as compared to the PtPd/$Al_2O_3$ catalyst) is advantageous, in part, because the catalyst is capable of CO and HC oxidation activity at lower temperatures. This is also expected to translate into significantly lower PGM loadings required for the same performance, which may lead to a reduction in cost of the precious metals used in the catalyst.

It is to be understood that the ranges provided herein include the stated range and any value or sub-range within the stated range. For example, a range of from 90:10 to 10:90 should be interpreted to include not only the explicitly recited limits of from 90:10 to 10:90, but also to include individual values, such as 70:10, 10:20, etc., and sub-ranges, such as from about 60:30 (i.e., 2:1) to about 10:30, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered exemplary rather than limiting.

The invention claimed is:

1. A catalytic converter, comprising:
a catalyst to improve low temperature oxidation of carbon monoxide (CO) and hydrocarbons, the catalyst including:
a support including a porous alumina structure and a rare earth metal oxide promoter impregnated into pores of the porous alumina structure, the rare earth metal oxide promoter being selected from the group consisting of $CeO_2$ and $CeO_2$—$ZrO_2$; and
a platinum group metal (PGM) bonded to the support and present in an amount ranging from about 0.1 wt. % to about 10 wt. % of the catalyst.

2. The catalytic converter as defined in claim 1 wherein the PGM is selected from the group consisting of palladium, platinum, rhodium, ruthenium, iridium, osmium, and combinations thereof.

3. The catalytic converter as defined in claim 1 wherein the rare earth metal oxide promoter is present in an amount up to about 30 wt % of the catalyst.

4. The catalytic converter as defined in claim 1 wherein the rare earth metal oxide promoter is $CeO_2$—$ZrO_2$ having a weight ratio of $CeO_2$:$ZrO_2$ ranging from about 90:10 to 10:90.

5. The catalytic converter as defined in claim 1, further comprising a monolith substrate having a honeycomb structure, wherein the catalyst is applied on interior surfaces of the honeycomb structure.

6. The catalytic converter as defined in claim 1 wherein the catalytic converter is a diesel oxidation catalyst (DOC).

7. The catalytic converter as defined in claim 6 wherein a carbon monoxide (CO) light-off temperature of the DOC is 184° C. or less and a hydrocarbon light-off temperature of the DOC is 197° C. or less.

8. The catalytic converter as defined in claim 1 wherein the catalytic converter is a three-way catalyst (TWC).

9. A method of making a catalyst for use in a catalytic converter having improved low temperature oxidation of carbon monoxide (CO) and hydrocarbons, the method comprising:
impregnating a rare earth metal oxide promoter into pores of a porous alumina structure, thereby forming a support, wherein the rare earth metal oxide promoter is selected from the group consisting of $CeO_2$ and $CeO_2$—$ZrO_2$; and
depositing a platinum group metal (PGM) on the support in an amount ranging from about 0.1 wt. % to about 10 wt. % of the catalyst.

10. The method as defined in claim 9 wherein impregnating the rare earth metal oxide promoter into pores of the porous alumina structure includes:
adding alumina powder into a rare earth metal oxide promoter precursor solution;
allowing the alumina powder to absorb the rare earth metal oxide promoter precursor solution to form a support precursor; and
drying and calcining the support precursor, thereby oxidizing a rare earth metal oxide precursor in the rare earth metal oxide promoter precursor solution to form the rare earth metal oxide promoter.

11. The method as defined in claim 10 wherein the drying is accomplished at about 120° C. and the calcining is accomplished at about 550° C.

12. The method as defined in claim 10 wherein the rare earth metal oxide promoter precursor solution is a cerium nitrate solution, a cerium acetate solution, a cerium nitrate and zirconium nitrate solution, a cerium acetate and zirconium acetate solution, or combinations thereof.

13. The method as defined in claim 10 wherein a pH of the rare earth metal oxide promoter precursor solution is maintained throughout impregnation.

14. The method as defined in claim 10 wherein depositing the PGM on the support is accomplished by a pore-filling method.

15. A diesel oxidation catalyst (DOC), comprising:
a monolith substrate having a honeycomb structure; and
a catalyst applied on interior surfaces of the honeycomb structure, the catalyst including:
a support including a porous alumina structure and a rare earth metal oxide promoter impregnated into pores of the porous alumina structure, the rare earth metal oxide promoter being selected from the group consisting of $CeO_2$ and $CeO_2$—$ZrO_2$; and
a platinum group metal (PGM) bonded to the support and present in an amount ranging from about 0.1 wt. % to about 10 wt. % of the catalyst;
wherein each of a carbon monoxide (CO) light-off temperature of the DOC and a hydrocarbon light-off temperature of the DOC is less than 200° C.

* * * * *